United States Patent
Göras et al.

(10) Patent No.: US 8,127,637 B2
(45) Date of Patent: Mar. 6, 2012

(54) GEAR CHANGE ARRANGEMENT AND A GEARBOX

(75) Inventors: Erik Göras, Solna (SE); Magnus Hagberg, Södertälje (SE)

(73) Assignee: Scania CV AB (SE)

( * ) Notice: Subject to any disclaimer, the term of this patent is extended or adjusted under 35 U.S.C. 154(b) by 744 days.

(21) Appl. No.: 12/299,367

(22) PCT Filed: Apr. 25, 2007

(86) PCT No.: PCT/SE2007/050273
§ 371 (c)(1),
(2), (4) Date: Nov. 3, 2008

(87) PCT Pub. No.: WO2007/126376
PCT Pub. Date: Nov. 8, 2007

(65) Prior Publication Data
US 2009/0235776 A1    Sep. 24, 2009

(30) Foreign Application Priority Data

May 3, 2006  (SE) ........................................ 0600968

(51) Int. Cl.
*G05G 5/06* (2006.01)
(52) U.S. Cl. ...................... 74/473.28; 74/527; 74/473.21
(58) Field of Classification Search .................... 74/527, 74/473.24–473.26, 473.36, 473.28; 267/158–161, 267/163
See application file for complete search history.

(56) References Cited

U.S. PATENT DOCUMENTS

| | | | | |
|---|---|---|---|---|
| 3,164,030 | A * | 1/1965 | Fodrea et al. | 74/473.26 |
| 3,800,617 | A * | 4/1974 | Dornan | 74/473.26 |
| 3,987,879 | A * | 10/1976 | Longshore et al. | 192/219.5 |
| 4,069,723 | A * | 1/1978 | Payerle | 74/528 |
| 4,275,613 | A * | 6/1981 | Worner et al. | 74/473.26 |
| 7,963,187 | B2 * | 6/2011 | Goras et al. | 74/473.26 |

FOREIGN PATENT DOCUMENTS

| | | | |
|---|---|---|---|
| DE | 4 340 139 A1 | 6/1995 | |
| EP | 0 702 172 A1 | 3/1996 | |
| EP | 0 913 604 A1 | 5/1999 | |
| EP | 0 967 420 A1 | 12/1999 | |
| EP | 1 041 317 A1 | 10/2000 | |

OTHER PUBLICATIONS

International Search Report dated Aug. 7, 2007, issued in corresponding international application No. PCT/SE2007/050273.

* cited by examiner

*Primary Examiner* — William C Joyce
*Assistant Examiner* — Terence Boes
(74) *Attorney, Agent, or Firm* — Ostrolenk Faber LLP

(57) ABSTRACT

A control device for controlling engagement of desired gears of a gearbox. The control device includes a holder unit and at least one control rod which has a relating locking arrangement and is arranged for linear movement in the holder unit. The control rod is provided with one or more recesses which each define a predetermined setting position of the control rod relative to the holder unit. The locking arrangement includes a locking device which is movable, substantially perpendicularly to the control rod's longitudinal axis, between a first position in which the locking device engages in one of the recesses in the control rod, and a second position in which the locking device does not engage in any of the recesses in the control rod. A wire spring fastened in a holder arrangement is firmly connected to the holder unit. The locking device is mounted on or forms part of the wire spring and is movable from the first position to the second position against the action of the spring force of the wire spring. A gearbox comprising such a control device is disclosed.

12 Claims, 6 Drawing Sheets

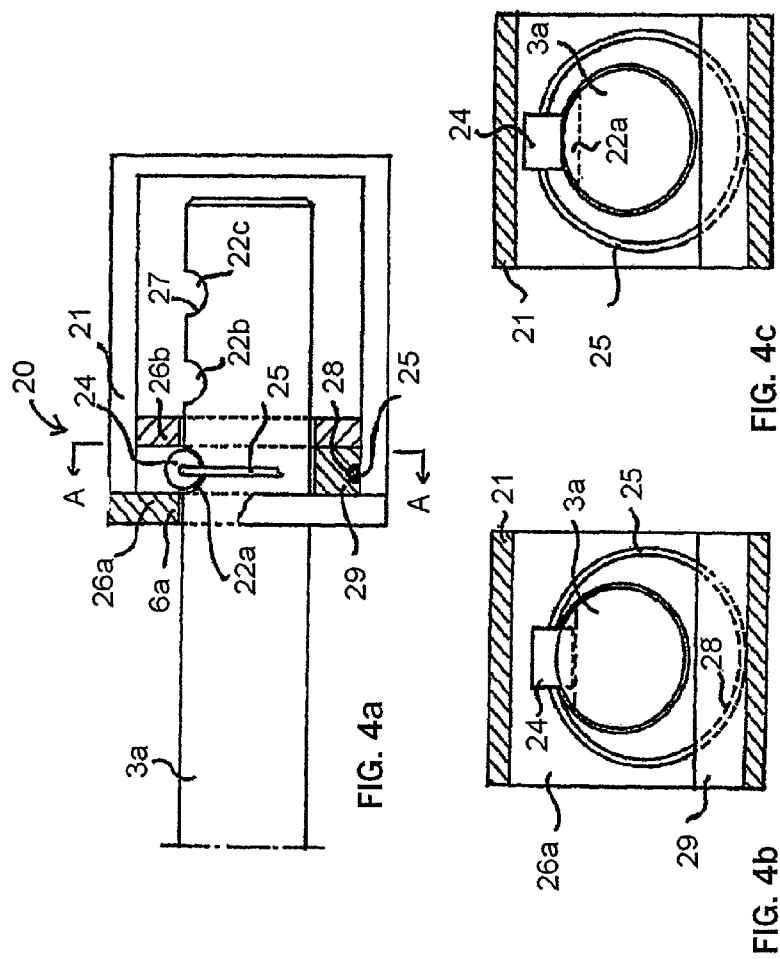

GEAR CHANGE ARRANGEMENT AND A GEARBOX

CROSS REFERENCE TO RELATED APPLICATION

The present application is a 35 U.S.C. §§371 national phase conversion of PCT/SE2007/050273, filed 25 Apr. 2007, which claims priority of Swedish Application No. 0600968-2, filed 3 May 2006. The PCT International Application was published in the English language.

FIELD OF THE INVENTION AND STATE OF THE ART

The present invention relates to a control device for a gear change arrangement and a gearbox comprising such a control device.

In a manual gearbox of a motor vehicle, e.g. a passenger car, a truck, a tractor vehicle for semitrailers or a bus, the engagement of desired gears is usually controlled by a control device which forms part of the gearbox and is provided with a plurality of control rods. These control rods can, by operation of the vehicle's gear lever, be moved between various predetermined setting positions which define the various gear positions of the gearbox. Each control rod cooperates with a locking arrangement which ensures that the control rod will assume one of the predetermined setting positions in response to movement of the gear lever and that the control rod is not unintentionally shifted from the relevant setting position. EP 0 702 172 A1 refers to a conventional type of locking arrangement for a control rod of a gearbox. This locking arrangement comprises a locking device which, through the action of a spring, is adapted to engaging in various recesses of the control rod. Each of these recesses corresponds to a predetermined setting position of the control rod. Each recess has a guide surface for cooperating with the locking device in such a way that the locking device, through the action of this guide surface and against the action of the spring means, moves from a protruded position to a retracted position in response to an axial movement of the control rod, starting from a setting position of the control rod with the locking device engaged in the respective recess. Changing from one setting position to another thus entails the control rod being moved in its longitudinal direction with sufficient force to overcome the spring force from the spring which, via the locking device, counteracts such movement. When the control rod has been moved so far that another of these recesses arrives at the locking device, the locking device will, through the action of the spring, move forward to engage with that recess and thereby resist further movement of the control rod. By means of these locking functions, the person operating the gear lever receives via the respective control rod and the gear lever a perception of the various gear positions.

OBJECT OF THE INVENTION

The object of the invention is to provide a further development of a control device of the type indicated above in order to propose a configuration which in at least some respects affords an advantage as compared with a conventionally configured control device.

SUMMARY OF THE INVENTION

According to the present invention, said object is achieved by means of a control device having the features disclosed herein.

According to the invention, the control device comprises a holder unit and at least one control rod arranged for movement in the holder unit. The control device has a relating locking arrangement and is provided with one or more recesses which each define a predetermined setting position of the control rod relative to the holder unit. The locking arrangement comprises a locking device movable, substantially perpendicularly to the longitudinal axis of the control rod, between a first position in which the locking device engages in one of the recesses in the control rod and thereby resists movement of the control rod relative to the holder unit, and a second position in which the control rod does not engage in any of the grooves in the control rod. The locking arrangement further comprises a wire spring fastened in a holder arrangement connected firmly to the holder unit, whereby the locking device is mounted on or forms part of this wire spring and is movable from the first position to the second position against the action of the spring force of this wire spring.

The locking in device being mounted on or forming part of a wire spring which provides the necessary spring force for the locking arrangement makes it possible for the locking arrangement to have a simple and space-saving configuration comprising relatively few components, resulting inter alia in the possibility of low manufacturing costs.

According to a preferred embodiment of the invention, the locking device takes the form of a roller mounted for rotation on the wire spring, resulting in low friction and little wear between the locking device and the control rod.

Various embodiments of the control device according to the invention are indicated in the description below.

The invention also relates to a gearbox, preferably in the form of a manual gearbox for a motor vehicle, comprising a control device according to the present invention.

BRIEF DESCRIPTION OF THE DRAWINGS

The invention is described below in more detail on the basis of embodiment examples with reference to the attached drawings, in which:

FIG. 4a depicts a schematic partly cutaway side view of part of a control rod with a relating locking arrangement according to a first embodiment, shown in a locking position, FIG. 4b depicts a schematic cross-section through 4a-4a in FIG. 4a, FIG. 4c depicts the cross-section according to FIG. 4b with the locking arrangement shown in a non-locking position.

DETAILED DESCRIPTION OF PREFERRED EMBODIMENTS

The control device 1 according to the invention is intended to form part of a gearbox in order to control the engagement of desired gears of the gearbox. Apart from the locking arrangements described below, the control device and the relating gearbox may be of conventional and known configuration.

Figure 1:
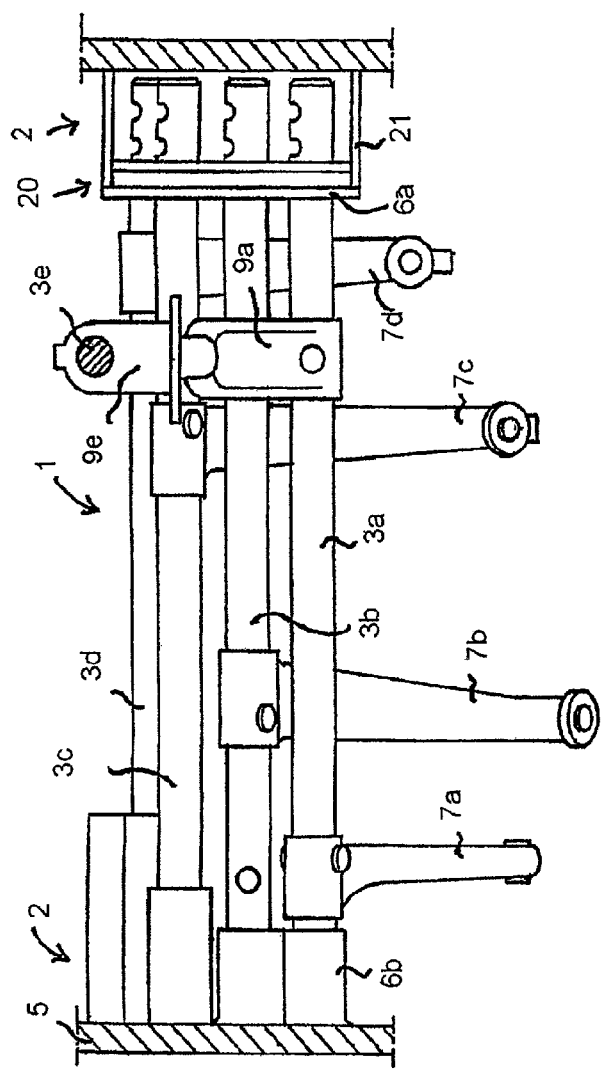
FIG. 1 depicts a schematic side view of control rods forming part of a control device according to the present invention.
Figure 2:
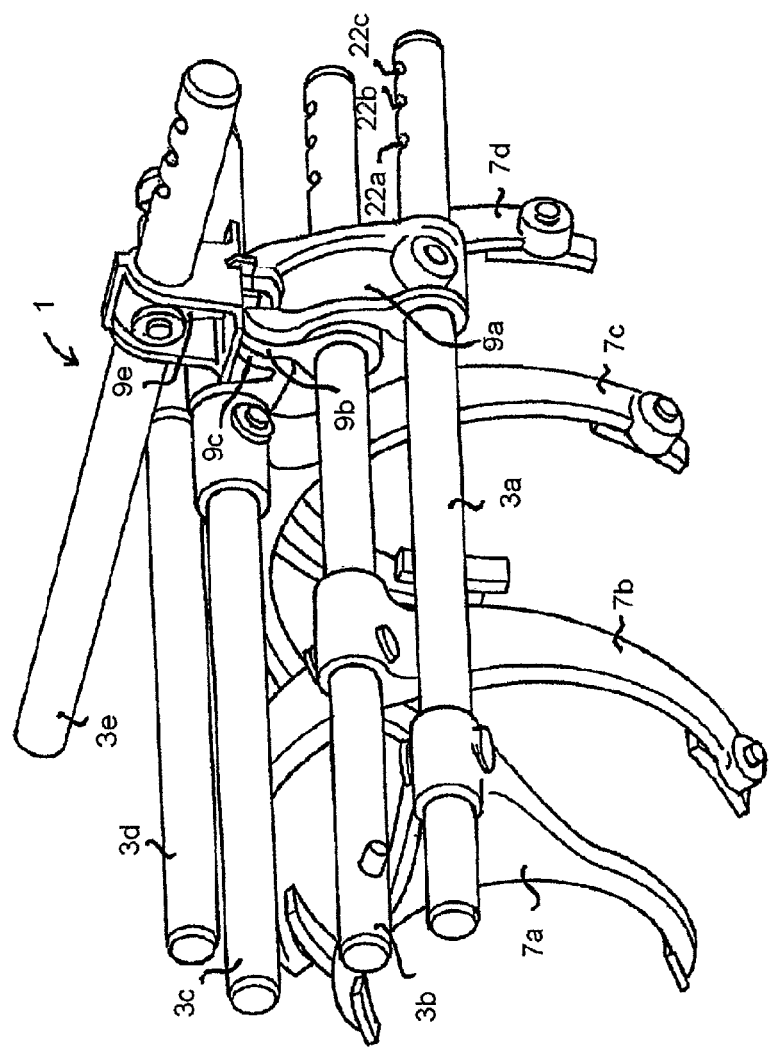
FIG. 2 depicts a perspective view of the control rods according to FIG. 1.

FIGS. 1 and 2 illustrate four control rods 3a-3d arranged for linear movement in a holder unit 2 and forming part of a control device 1 according to the present invention. In FIG. 2, the holder unit is omitted for the sake of clarity. The number of control rods of the control device according to the invention may be both larger or smaller than here illustrated. The holder unit 2 may be integrated in the housing 5 of the relating gearbox, as schematically illustrated in FIG. 1. Each control rod 3a-3d is supported for movement relative to the holder unit 2 in such a way that relative to the holder unit it is movable in its longitudinal direction. Each control rod 3a-3d may be supported relative to the holder unit 2 via, for example, a plain bearing 6a, 6b at each end of the control rod, as illustrated in FIG. 1. Each control rod 3a-3d is connected in a known manner to a gear lever by means of which the control rod 3a-3d can be caused to move relative to the holder unit 2. By operating the gear lever between various predetermined positions, the user, e.g. a driver in a motor vehicle, can place the control rods 3a-3d in desired setting positions relative to the holder unit 2. Each control rod 3a-3d effects in a known manner not here described, via a selector fork 7a-7d, the engagement and disengagement of various predetermined gears of the gearbox. Each selector fork 7a-7d moves together with the relating control rod 3a-3d and acts upon the gear position of the gearbox via a known and not here illustrated control mechanism of the gearbox. Each control rod effects the engagement and disengagement of two different gears of the gearbox. From a neutral position, each control rod 3a-3d can be moved longitudinally in one direction to a predetermined setting position to engage a first of said two gears and in another direction to another predetermined setting position to engage the second of said two gears.

Of the aforesaid control rods, three control rods 3a-3c in the example illustrated are connected to a common control rod 3e, hereinafter called the operating rod. The operating rod 3e is supported for linear and rotary movement relative to the holder unit 2 in such a way that relative to the holder unit it is movable in its longitudinal direction and rotatable about its longitudinal axis. The operating rod 3e is connected in a known manner not here illustrated to a gear lever by means of which the operating rod 3e can be caused to perform linear and rotary movements relative to the holder unit 2. By operating the gear lever between various predetermined positions, the user, e.g. a driver in a motor vehicle, can move the operating rod 3e in its longitudinal direction and place it in any of a plurality of predetermined linear positions. For each of the control rods 3a-3c, the operating rod 3e has a predetermined linear position.

Depending on its linear position, the operating rod 3e is adapted to being able to move one control rod 3a-3c at a time between these predetermined setting positions by being rotated in a desired direction about its longitudinal axis. The control rods 3a-3c are each provided with control means 9a-9c for cooperation with a corresponding control means 9e of the operating rod 3e. Each control means 9a-9c, 9e is firmly connected to the relating rod 3a-3c, 3e. The control means 9e is thus caused to perform linear and rotary movements together with the operating rod 3e, and each control means 9a-9c will move together with the relating control rod 3a-3c. By movement of the operating rod 3e in its longitudinal direction, its control means 9e can be brought into engagement with one at a time of the control means 9a-9c of the control rods 3a-3c. When the operating rod 3e is in a linear position pertaining to a certain control rod 3a-3c, rotary motion of the operating rod 3e is converted to axial linear movement of the respective control rod via mutual engagement between the operating rod's control means 9e and the control rod's control means 9a-9c.

The setting position of the fourth control rod 3d in the example illustrated is not controlled by the operating rod 3e but may, for example, be adapted to being controlled pneumatically in a conventional manner not further described here.

Each of the control device's control rods 3a-3d is allocated a locking arrangement 20 adapted to defining one or more predetermined setting positions of the control rod 3a-3d relative to the holder unit 2. Each control rod 3a-3d has in its shell surface one or more recesses 22a-22c, in the example illustrated three recesses, each of which defines a predetermined setting position of the control rod.

Figure 5A:
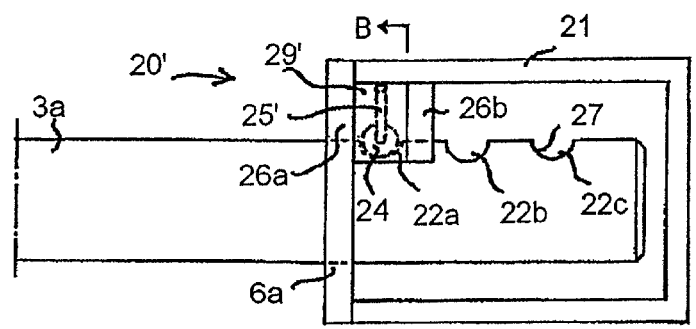
FIG. 5a depicts a schematic partly cutaway side view of part of a control rod with a relating locking arrangement according to a second embodiment, shown in a locking position.
Figure 5B:
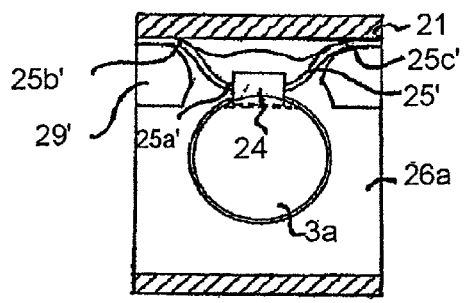
FIG. 5b depicts a schematic cross-section through 5a-5a in FIG. 5a, FIG. 5c depicts the cross-section according to FIG. 5b with the locking arrangement shown in a non-locking position.
Figure 5C:
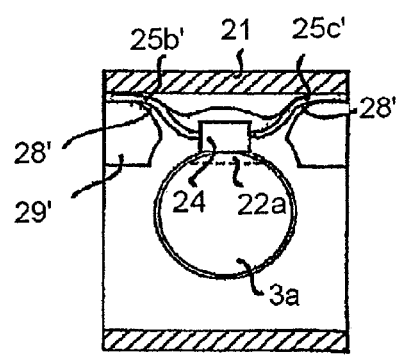
Figure 6A:
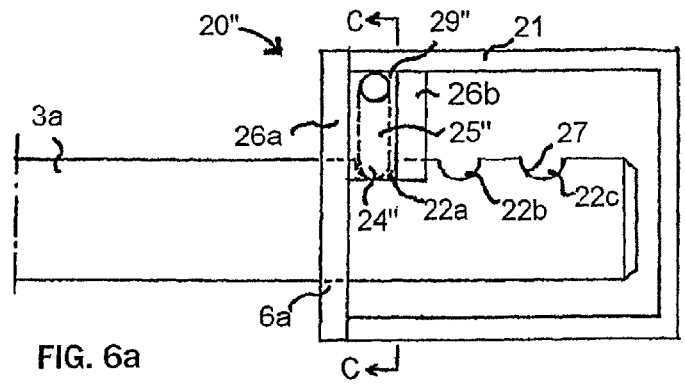
FIG. 6a depicts a schematic partly cutaway side view of part of a control rod with a relating locking arrangement according to a third embodiment, shown in a locking position.
Figure 6B:
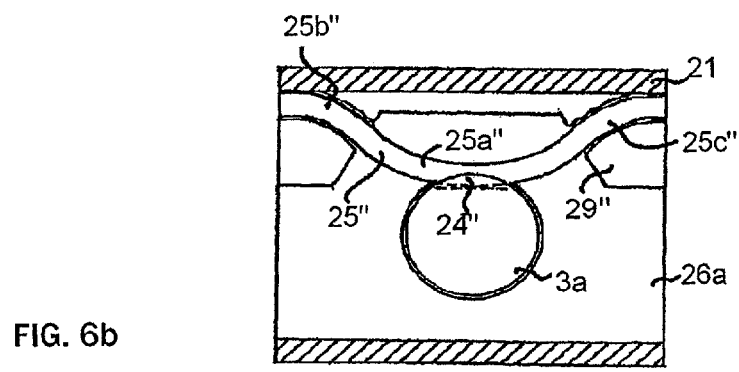
FIG. 6b depicts a schematic cross-section through 6a-6a in FIG. 6a, and FIG. 6c depicts the cross-section according to FIG. 6b with the locking arrangement shown in a non-locking position.
Figure 6C:
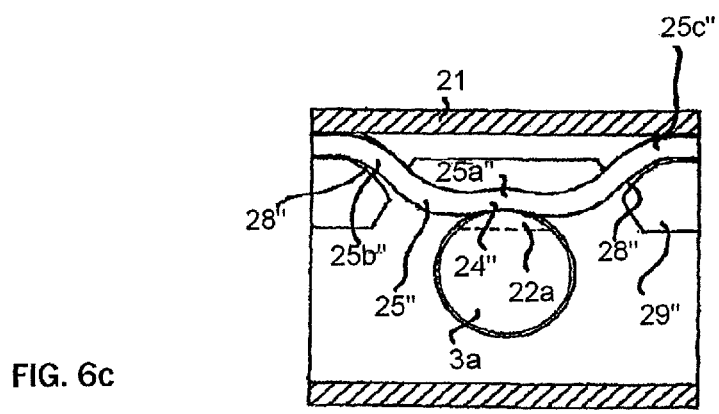

FIGS. 4a-4c, 5a-5c and 6a-6c illustrate locking arrangements 20, 20', 20" according to three different embodiments. In all of these embodiments, the locking arrangement 20, 20', 20" comprises a locking means 24, 24" which is movable, substantially perpendicularly to the longitudinal axis of the relating control rod, between a first position (see FIGS. 4a, 4b; 5a, 5b; 6a, 6b) in which the locking means 24, 24" engages in one of said recesses 22a-22c in the control rod and thereby resists movement of the control rod relative to the holder unit 2, and a second position (see FIGS. 4c; 5c; 6c) in which the locking means 24, 24" does not engage in any of said recesses in the control rod. The control rod 3a is arranged for movement relative to the locking means 24, 24". The locking means 24, 24" is with advantage arranged close to a bearing 6a which is one of the bearings via which the control rod 3a is fastened to the holder unit 2. Each recess 22a-22c of the control rod faces towards the locking means 24, 24" of the relating locking arrangement. In the example illustrated, each locking arrangement 20, 20', 20" is arranged to define three different setting positions of the relating control rod 3a relative to the holder unit 2 and in this case the control rod is therefore provided with three recesses 22a-22c arranged in line consecutively in the longitudinal direction of the control rod. In all of these embodiments, the locking arrangement 20, 20', 20" further comprises a wire spring 25, 25', 25" fastened in a holder arrangement 21 firmly connected to the holder unit 2, whereby the locking means 24, 24" of the locking arrangement is movable from said first position to said second position against the action of the spring force of the wire spring 25, 25', 25". According to a first alternative, the locking means 24 is mounted on the wire spring 25, 25', as illustrated in FIGS. 4a-4c and FIGS. 5a-5c. According to a second alternative, the locking means 24" forms part of the wire spring 25" as illustrated in FIGS. 6a-6c. The holder arrangement 21 is with advantage provided with guide means 26a, 26b, e.g. in the form of plates or the like, which ensure that the locking means 24, 24" is only movable substantially perpendicularly to the longitudinal axis of the relating control rod. The guide means 26a, 26b thus prevent the locking means 24, 24" from moving in the control rod's longitudinal direction.

To change from one setting position to another, the control rod 3a has to be moved in its longitudinal direction with such force that the spring force of the relating wire spring 25, 25', 25" is overcome and the locking means 24, 24" is brought out of engagement with the respective recess of the control rod. When thereafter the control rod has been moved far enough for the locking means 24, 24" to arrive in way of another of the control rod's recesses 22a-22c, the locking means 24, 24" will, through the action of the spring force of the wire spring 25, 25', 25", move to engage with that recess and thereby counteract further movement of the control rod. The wire spring 25, 25', 25" is elastically deformable and will undergo elastic deformation when the locking means 24, 24" moves from said first position to said second position. When thereafter the locking means 24, 24" returns to the first position, the wire spring 25, 25', 25" will spring back and resume its original shape.

Each recess 22a-22c in the control rod has a guide surface 27 adapted to cooperating with the locking means 24, 24" in such a way that the locking means 24, 24" will, through the action of that guide surface, move from said first position to said second position in response to a movement of the control rod 3a relative to the locking means 24, 24" starting from a setting position of the control rod with the locking means engaged in the respective recess 22a-22c.

The wire spring 25, 25', 25" has with advantage a monoplanar extent and is arranged to extend in a plane substantially perpendicular to the control rod's longitudinal axis. The expression "monoplanar extent" means here that the wire spring extends in substantially only one plane. The wire spring 25, 25', 25" and the locking means 24 are with advantage made of steel.

In the embodiment depicted in FIGS. 4a-4c, the wire spring 25 has the shape of a ring and the locking means 24 takes the form of a roller mounted on the wire spring, preferably mounted for rotation on the wire spring. The wire spring is in this case with advantage arranged to extend about the longitudinal axis of the relating control rod, as may be seen in FIGS. 4b and 4c. The annular wire spring 25 is in a suitable manner firmly clamped in the hole arrangement 21 via a section of the wire spring (in the example illustrated the lower section of the wire spring) which is situated directly opposite the section on which the locking means 24 is mounted, and is also movable in a plane substantially perpendicular to the control rod's longitudinal axis. In the example illustrated, the wire spring 25 is fitted in a groove 28 in a fastening plate 29 which forms part of the holder arrangement 21. Through the action of the spring force of the wire spring 25, the locking means 24 is preloaded against the control rod's shell surface and is therefore preloaded to assume said first position. In response to axial movement of the control rod 3a from the position illustrated in FIGS. 4a and 4b with the locking means 24 engaged in one of the control rod's recesses 22a-22c, the locking means will roll or slide along the control rod 3a and will, against the action of the spring force of the wire spring 25, move to the position illustrated in FIG. 4c where the locking means is not engaged in any of said recesses. This movement of the locking means 24 results in the wire spring 25 undergoing elastic deformation, as may be seen in FIGS. 4b and 4c. When thereafter the locking means 24 again engages in one of the control rod's recesses, the wire spring 25 will spring back and resume its original shape.

In the embodiments depicted in FIGS. 5a-5c and FIGS. 6a-6c, the wire spring 25', 25" is of elongate shape and has a middle portion 25a', 25a" which faces towards the control rod 3a, and two support portions 25b', 25c', 25b", 25c" which are arranged on opposite sides of the middle portion 25a', 25a" and support the middle portion 25a', 25a", via which support portions the wire spring 25', 25" is fastened in the holder arrangement 21. These support portions 25b', 25c', 25b", 25c" constitute limbs of the wire spring which connect to the middle portion 25a', 25a" situated centrally between the limbs. The middle portion 25a', 25a" is of convex shape in side view, as may be seen in FIGS. 5b, 5c, 6b and 6c. In the examples here illustrated, the wire spring 25', 25" is gullwing-shaped in side view with said middle portion 25a', 25a" facing downwards, as may be seen in FIGS. 5b, 5c, 6b and 6c. The wire spring 25', 25" might nevertheless also be of some other suitable shape. The wire spring 25', 25" is in a suitable manner clamped firmly in the holder arrangement 21 via its support portions 25b', 25c', 25b", 25c", and the middle portion 25a', 25a" is movable in a direction perpendicular to the control rod's longitudinal axis. In the examples illustrated in FIGS. 5a-5c and FIGS. 6a-6c, each of the wire spring's support portions 25b', 25c', 25b", 25c" is fitted in a groove 28', 28" in a fastening plate 29', 29" which forms part of the holder arrangement 21.

In the embodiment depicted in FIGS. 5a-5c, the locking means 24 takes the form of a roller mounted on said middle portion 25a' of the wire spring, preferably mounted for rotation on the wire spring. Through the action of the spring force of the wire spring 25', the locking means 24 is preloaded against the control rod's shell surface and is therefore preloaded to assume said first position. In response to axial movement of the control rod 3a from the position illustrated in FIGS. 5a and 5b with the locking means 24 engaged in one of the control rod's recesses 22a-22c, the locking means will roll or slide along the control rod 3a and will, against the action of the spring force of the wire spring 25', move to the position illustrated in FIG. 5c in which the locking means does not engage in any of said recesses. This movement of the locking means 24 will cause the wire spring 25' to undergo elastic deformation, as may be seen in FIGS. 5b and 5c. When thereafter the locking means 24 again engages in one of the control rod's recesses, the wire spring 25' will spring back and resume its original shape.

In the embodiment depicted in FIGS. 6a-6c, the locking means 24" forms part of said middle portion 25a" of the wire spring 25". Through the action of the spring force of the wire spring 25", the locking means 24" is preloaded against the control rod's shell surface and is therefore preloaded to assume said first position. In response to axial movement of the control rod 3a from the position illustrated in FIGS. 6a and 6b with the locking means 24" engaged in one of the control rod's recesses 22a-22c, the locking means will slide along the control rod 3a and will, against the action of the spring force of the wire spring 25", move to the position illustrated in FIG. 6c in which the locking means does not engage in any of said recesses. This movement of the locking means 24" will cause the wire spring 25" to undergo elastic deformation, as may be seen in FIGS. 6b and 6c. When thereafter the locking means 24" again engages in one of the control rod's recesses, the wire spring 25" will spring back and resume its original shape.

With advantage, the operating rod 3e is also allocated a locking arrangement of the type described above which defines various predetermined setting positions of the operating rod 3e relative to the holder unit 2.

Figure 3:
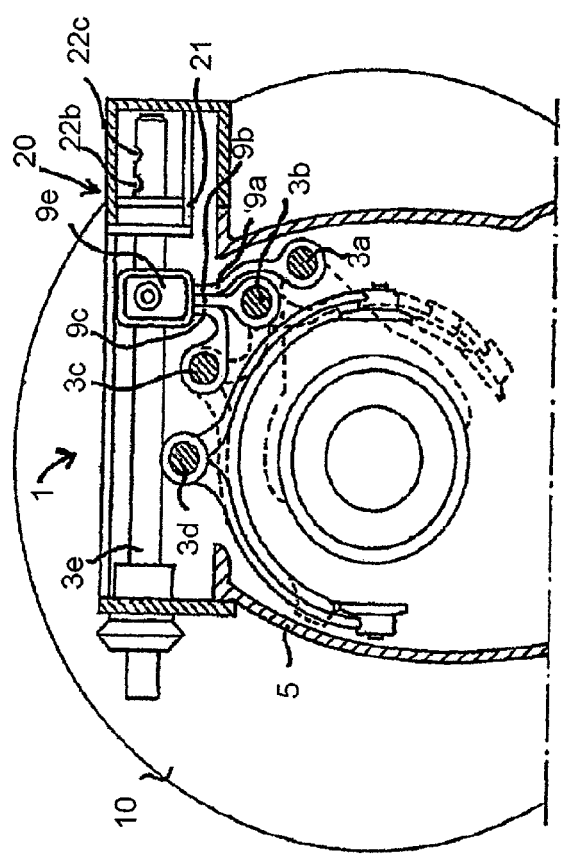
FIG. 3 depicts a schematic partly cutaway view from the rear of the upper part of a gearbox provided with a control device according to the present invention.

The control device 1 according to the invention is particularly intended to form part of a manual gearbox for a motor vehicle. Part of such a gearbox 10 is illustrated schematically in FIG. 3.

The invention is of course in no way limited to the embodiments described above, since a multiplicity of possibilities for modifications thereof are likely to be obvious to a specialist in the field without thereby having to deviate from the basic concept of the invention as defined in the attached claims.

The invention claimed is:

1. A control device for controlling the engagement of desired gears of a gearbox, the control device comprising:
   a holder unit and at least one control rod with a relating locking arrangement, wherein:
   the control rod is configured for linear movement in the holder unit, and the locking arrangement is operable to define one or more predetermined setting positions of the control rod relative to the holder unit,
   the control rod has one or more recesses which each define a predetermined setting position of the control rod with respect to the holder unit, and
   the locking arrangement comprises a locking device which is movable, substantially perpendicularly to a longitudinal axis of the control rod, between a first position in which the locking device engages in one of the recesses in the control rod and thereby resists movement of the control rod relative to the holder unit, and a second position in which the locking device does not engage in any of the recesses in the control rod;
   a holder arrangement which is firmly connected to the holder unit, the locking arrangement comprises the holder arrangement and a wire spring fastened in the holder arrangement;
   the wire spring extends in a plane substantially perpendicular to the longitudinal axis of the control rod;
   the wire spring includes a middle portion which faces toward the control rod, and two support portions on opposite sides of, and operable to support the middle portion for fastening the wire spring in the holder arrangement
   wherein the locking device is mounted on or forms part of the wire spring and is movable from the first position to the second position against the action of the spring force of the wire spring, wherein the two support portions are positioned longitudinally in the plane transverse to the longitudinal axis of the control rod, and are fixed to the holder arrangement.

2. A control device according to claim 1, wherein the wire spring has the shape of a ring.

3. A control device according to claim 2, wherein the wire spring extends around the longitudinal axis of the control rod.

4. A control device according to claim 1, wherein the wire spring is gullwing-shaped in a view across the axis of the rod, with the middle portion facing downwards.

5. A control device according to claim 1, wherein the middle portion is of convex shape in a view across the axis of the rod.

6. A control device according to claim 1, wherein the locking device is mounted on the middle portion.

7. A control device according to claim 1, wherein the locking device is mounted on the middle portion.

8. A control device according to claim 1, wherein the locking device comprises a roller mounted on the wire spring.

9. A control device according to claim 8, wherein the locking device is mounted for rotation on the wire spring.

10. A manual gearbox for a motor vehicle, comprising a control device according to claim 1.

11. A gearbox according to claim 10, wherein the wire spring has the shape of a ring.

12. A manual gearbox for an automobile comprising:
    a control device for controlling the engagement of desired gears of a gearbox, the control device comprising:
    a holder unit and at least one control rod with a relating locking arrangement, wherein:
    the control rod is configured for linear movement in the holder unit, and the locking arrangement is operable to define one or more predetermined setting positions of the control rod relative to the holder unit,
    the control rod has one or more recesses which each define a predetermined setting position of the control rod with respect to the holder unit, and
    the locking arrangement comprises a locking device which is movable, substantially perpendicularly to a longitudinal axis of the control rod, between a first position in which the locking device engages in one of the recesses in the control rod and thereby resists movement of the control rod relative to the holder unit, and a second position in which the locking device does not engage in any of the recesses in the control rod;
    a holder arrangement which is firmly connected to the holder unit, the locking arrangement comprises the holder arrangement and a wire spring fastened in the holder arrangement, wherein the locking device is mounted on or forms part of the wire spring and is movable from the first position to the second position against the action of the spring force of the wire spring;
    the wire spring includes a middle portion which faces toward the control rod, and two support portions on opposite sides of, and operable to support, the middle portion for fastening the wire spring in the holder arrangement, wherein the two support portions are positioned longitudinally in the plane transverse to the longitudinal axis of the control rod, and are fixed to the holder arrangement.

* * * * *